(12) United States Patent
Green et al.

(10) Patent No.: US 6,470,120 B2
(45) Date of Patent: Oct. 22, 2002

(54) METHOD AND APPARATUS FOR ALIGNING FIBER OPTICS WITH OPTICAL ELEMENTS

(75) Inventors: Evan D. H. Green, San Jose, CA (US); Manish Sharma, Santa Clara, CA (US)

(73) Assignee: New Focus, Inc., San Jose, CA (US)

( * ) Notice: Subject to any disclaimer, the term of this patent is extended or adjusted under 35 U.S.C. 154(b) by 0 days.

(21) Appl. No.: 09/736,789

(22) Filed: Dec. 13, 2000

(65) Prior Publication Data

US 2002/0025124 A1 Feb. 28, 2002

Related U.S. Application Data

(60) Provisional application No. 60/170,454, filed on Dec. 13, 1999.

(51) Int. Cl.[7] .............................. G02B 6/26; G02B 6/42; G02B 6/36; G02B 7/02
(52) U.S. Cl. .............................. 385/52; 385/67; 385/74; 385/90; 385/88; 385/93; 359/813; 359/822
(58) Field of Search .............................. 385/52, 55, 66, 385/67, 84, 88, 90, 93, 33, 74, 136; 359/813, 814, 822

(56) References Cited

U.S. PATENT DOCUMENTS

| | | | |
|---|---|---|---|
| 3,713,725 A | * | 1/1973 | Uesugi ........................ 359/813 |
| 3,800,388 A | * | 4/1974 | Borner et al. ................ 385/134 |
| 3,936,143 A | | 2/1976 | Sato .......................... 350/96 C |
| 4,019,806 A | * | 4/1977 | Fellows et al. ................ 385/67 |
| 4,215,937 A | | 8/1980 | Borsuk ....................... 356/73.1 |
| 4,239,333 A | * | 12/1980 | Dakss et al. .................. 385/67 |
| 4,398,797 A | * | 8/1983 | Wedertz et al. ............. 385/137 |
| 4,723,075 A | * | 2/1988 | German ....................... 359/813 |
| 5,812,258 A | | 9/1998 | Pierson ........................ 356/153 |
| 6,262,853 B1 | * | 7/2001 | Takanashit et al. ......... 359/703 |
| 6,310,721 B2 | * | 10/2001 | Carmi et al. ................. 359/399 |

FOREIGN PATENT DOCUMENTS

DE          2358785          6/1975  ............. 385/147 X

* cited by examiner

*Primary Examiner*—Brian Healy
*Assistant Examiner*—Kevin S Wood
(74) *Attorney, Agent, or Firm*—Cary & Kelly, LLP; Charles C. Cary (57) ABSTRACT

Apparatus and associated method for aligning optical components including lenses, filters, lasers, fiber optics, etc. The apparatus aligns a first optic element and a second optic element and includes a frame and a sleeve. The frame defines a frame bore along a longitudinal axis thereof. The sleeve defines an eccentric bore configured to contain the first optic element or the second optic element. The sleeve is rotatably coupled in the frame bore to align the first optic element with the second optic element in a plane intersected by the longitudinal axis.

19 Claims, 9 Drawing Sheets

FIG. 9

METHOD AND APPARATUS FOR ALIGNING FIBER OPTICS WITH OPTICAL ELEMENTS

CROSS-REFERENCE TO RELATED APPLICATION

This application claims priority from Provisional Application No.: 60/170,454, entitled "METHOD AND APPARATUS FOR ALIGNING FIBER OPTICS WITH OPTICAL ELEMENTS" filed on Dec. 13, 1999 which is incorporated herein by reference in its entirety.

STATEMENT REGARDING FEDERALLY SPONSORED RESEARCH

The U.S. Government has rights in this invention as provided for by the terms of NIST Cooperative Agreement No. 70NANB5H1092.

BACKGROUND OF THE INVENTION

1. Field of the Invention

This invention generally relates to alignment of optical elements and in particular to alignment of a fiber optic with active or passive optical components.

2. Description of the Related Art

The telecommunications network serving the United States and the rest of the world is presently evolving from analog to digital transmission with ever increasing bandwidth requirements. Fiber optic cable has proved to be a valuable tool, replacing copper cable in nearly every application from large trunks to subscriber distribution plants. Fiber optic cable is capable of carrying much more information than copper with lower attenuation.

In a typical optical fiber, separate subscriber/data sessions are handled concurrently on a single optic fiber by means of modulation of each of those subscriber data streams on different portions of the light spectrum by what is known as "wavelength division multiplexing" (WDM). Current implementations of WDM involve as many as 128 semiconductor lasers each lasing at a specific center frequency within the range of 1525–1575 nm. Each subscriber DataStream is optically modulated onto the output beam of a corresponding semiconductor laser. The modulated information from each of the semiconductor lasers is combined onto a single optic fiber for transmission. As this digital signal is passed across an optical network, it will be subject at various intervals to amplification by, for example, Erbium doped amplifiers and dispersion compensation by, for example, optical circulators with coupled Bragg filters. At each node in the network, e.g. central office or remote terminal, optical transceivers mounted on fiber line cards are provided. On the transmit side, a framer permits SONET framing, pointer generation and scrambling for transmission of data from a bank of lasers and associated drivers, with each laser radiating at a different wavelength. On the receive side, the incoming signals are separated into channels detected by photo detectors, framed and decoded.

Throughout the network a broad range of active optical components such as lasers and photo detectors and passive optical components such as circulators and isolators and filters are utilized to process optical beams from individual optical fibers. Each junction between an optical fiber and these active and passive optical components requires extremely precise alignment between the fiber and component in order to maximize coupling efficiency. Alignment tolerances on the order of 0.1 micron or less are common.

In order to achieve these tolerances a three step fabrication process is required for each completed assembly. In the first step an elaborate clamping fixture is used to clamp fiber and component relative to one another. Then either one or both of the fiber and component are manually brought into alignment using the micrometers and angle plates which make up the typical clamping fixture. In the second step the component and fiber are fixed to one another using epoxy or some other fastening method and the fixture is removed. The removal of the frame typically results in a release of strain or tension in the bond joining the fiber and component. This produces small but significant misalignment of the assembly, which in turn results in the necessity of a third and final assembly step. In the third step the completed assembly is reclamped in a temporary fixture and the fiber or component are struck with a hammer or other more precise instrument to bring them back into alignment. The above discussed process is very time consuming and labor intensive and accounts for a major portion of the finished assemblies cost.

What is needed are improved methods which reduce the time, cost and expenses associated with the alignment of fiber optic assemblies.

SUMMARY OF THE INVENTION

The current invention provides a method and apparatus for aligning optical components including lenses, filters, lasers, fiber optics, etc. It may be used with particular advantage for the alignment of a fiber optic with active or passive optical components. It is inexpensive to fabricate. It does away with the need for expensive setup equipment. It allows optical components to be aligned with a high degree of accuracy and permanence. It has a small form factor.

In an embodiment of the invention the apparatus for aligning at least a first optic element and a second optic element includes a frame and at least one sleeve. The frame defines a frame bore along a longitudinal axis thereof. The at least one sleeve defines an eccentric bore configured to contain a respective one of the first optic element and the second optic element. The at least one sleeve is rotatably coupled with respect to the frame bore to align the first optic element with the second optic element in a plane intersected by the longitudinal axis.

In an alternate embodiment of the invention the apparatus for aligning includes a frame and at least one pair of nested sleeves. The frame defines a frame bore along a longitudinal axis thereof. The at least one pair of nested sleeves each include a corresponding eccentric bore, with an inner nested one of said pair of nested sleeves coupled to at least one of the first optic element and the second optic element and an outer one of said pair of nested sleeves rotatably coupled to said frame bore to align the first optic element with the second optic element by an epicyclic motion of the at least one of the first optic element and the second optic element.

In still another embodiment of the invention a method for aligning at least a first optic element and a second optic element, at a selected location relative to one another is disclosed. The method comprises the act of effecting an epicyclic rotation of at least a selected one of the first optic element and the second optic element to align the optic elements at the selected location.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

A method and apparatus for aligning optical components including lenses, filters, lasers, fiber optics, etc is provided. Typically optical component assembly requires close alignment of components. Tolerances of 0.1 micron are standard in the telecommunications industry. The optical component aligner of the current invention provides an inexpensive apparatus for assembling optical components with these close alignment tolerances. It may be used with particular advantage for the alignment of a fiber optic with active or passive optical components. It is inexpensive to fabricate. It does away with the need for expensive setup equipment. It allows optical components to be aligned with a high degree of accuracy and permanence. It has a small form factor. Optical components are mounted in one or more eccentric sleeves the rotation of which permits precise relative motion between the components to be aligned. The sleeves are rotatable with respect to a frame or housing during alignment and are fixed with respect to the frame once proper alignment has been achieved.

Figure 1:
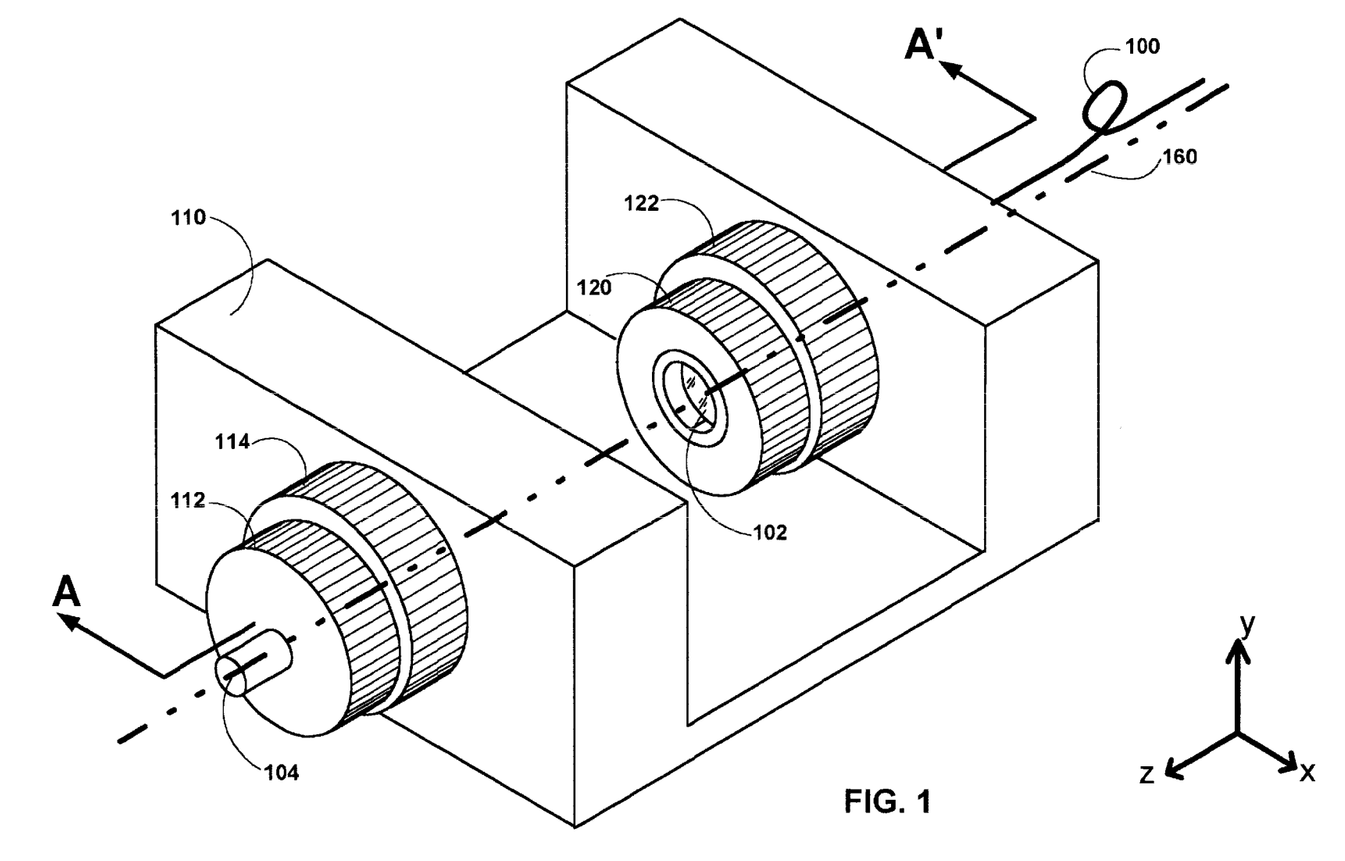
FIG. 1 is an isometric view of an embodiment of the fiber optic aligner in which dual eccentric sleeves are used to align a fiber optic, a lens, and an optical source.

FIG. 1 is an isometric view of an embodiment of the fiber optic aligner in which dual eccentric sleeves are used to align a fiber optic, a lens, and an optical source. The aligner includes a frame 110, and first and second dual eccentric sleeve pairs 112–114 and 120–122 respectively. The first dual eccentric sleeve pair 112–114 contains on the innermost bore thereof an optical source or sink 104. Optical sources may include a laser diode or gain medium, an optical sink may include a photodiode. The second eccentric sleeve pair 120–122 contains on the innermost bore thereof a lens for focusing and collimating an optical beam between the optical fiber 100 and the optical sink or source 104. The components are shown displaced from one another along a longitudinal axis 160 of the frame.

Alignment of the fiber, lens, and source/sink requires particularly close tolerances in the x-y plane substantially orthogonal to and/or intersecting the longitudinal axis. These tolerances are achieved by means of the rotation of the eccentric sleeves to translate the associated component, e.g. lens, fiber, or optical source/sink, through various locations within the x-y plane. The coupling efficiency may be measured during alignment by means of an intensity measurement with external instrumentation of an optical beam passing through the assembly. Once adjustment has been made of the dual eccentrics to achieve optimal coupling of the components the eccentric sleeves are fastened to one another and to the frame using any of a number of fastening techniques. Acceptable means of fastening include but are not limited to epoxy, welding, soldering etc. The completed assembly includes the inexpensive eccentric sleeves. Since the components are integrated with the eccentric sleeves the amount of epoxy or other fastener is limited thus improving the stability of the assembly.

In alternate embodiments of the invention eccentric sleeves either singly or in combination may be used to achieve alignment of optical components. Components to be aligned need not include a fiber optic. Precise tolerances may also be required for the alignment of optical components such as: lenses, filters, lasers, gratings, etc.

Although the eccentric sleeves shown in this and the following FIGS. have generally cylindrical outer surfaces such need not be the case. Suitable sleeves may have triangular, square, or other polygonal outer surfaces suitable for rotation within its host bore.

Figure 2A:
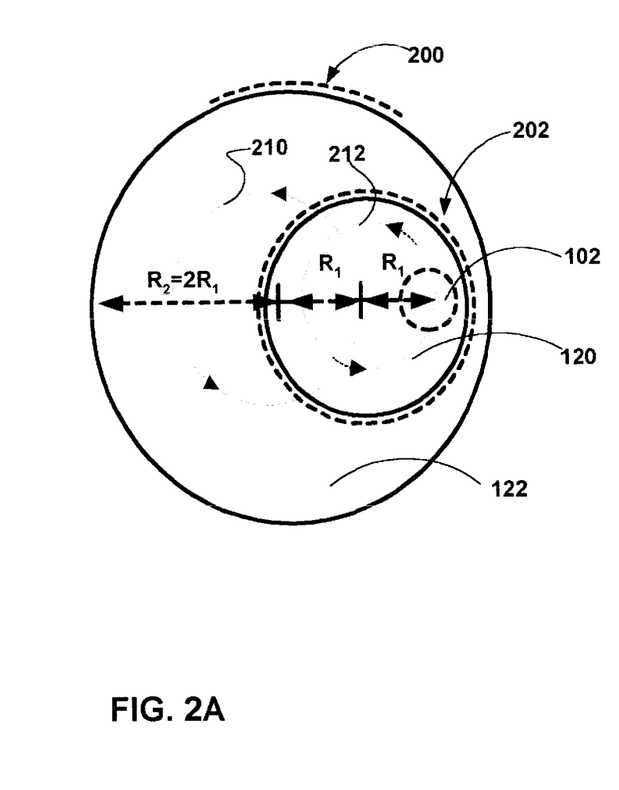
FIGS. 2AB are graphs showing the planar translation effected by the dual eccentric alignment mechanism shown in FIG. 1.
Figure 2B:
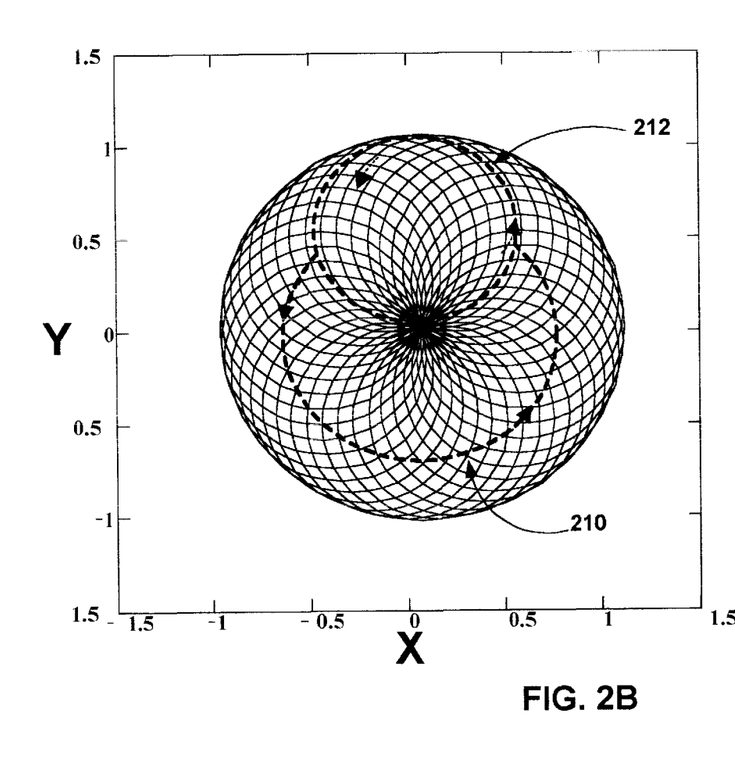

FIGS. 2AB are graphs showing the planar translation effected by the dual eccentric alignment mechanism shown in FIG. 1. FIG. 2A is an end view of the longitudinal axis of one of the dual eccentric sleeves 120 and 122 shown in FIG. 1. The outer sleeve 122 has a cylindrical outer surface 200 and a radius $R_2$. The outer sleeve defines a cylindrical bore 202 eccentrically located at a distance $R_1$ from the center of the outer sleeve. In the example shown $R_1$ approximately equals ½ of $R_2$. The bore has the radius $R_1$. The inner eccentric sleeve 120 is rotatably positioned in the bore of the outer sleeve. The inner sleeve itself defines a second eccentric bore in which the lens 102 is positioned. A rotation of the outer sleeve results in the centerline of its bore tracing out the circular path 210. A rotation of the inner sleeve results in the centerline of the lens tracing out a second circular path 212. Through various amounts of absolute and/or relative rotation of the sleeves with respect to one another and with respect to the frame the positioning of the lens can cover the entire cylindrical portion of the x-y plane shown in FIG. 2B. The Eccentric-Eccentric The technique described in this embodiment of the invention is termed the "eccentric-eccentric." All motions are epicyclic as shown in the following FIGS. 2AB and 8. These epicyclic motions result from rotations of nested eccentric cylinders, and are therefore either rotations of the sleeves with respect to themselves or along the cylindrical axis. If the optical component in the cylinder is not centered, it can be translated during rotation of the cylinder within its sleeve, providing the required motion during alignment. The lens and fiber are placed into eccentric cylinders within a common sleeve. Rotation of the lens cylinder or the fiber cylinder gives relative x, y motion between the lens and the fiber, which are the two most sensitive degrees of freedom, typically requiring alignment tolerances of 0.1 micron. FIG. 2B displays the parametric curves of x, y positions for the lens 120 brought about by the dual eccentric sleeves 120–122 shown in FIG. 2A.

Figure 3:
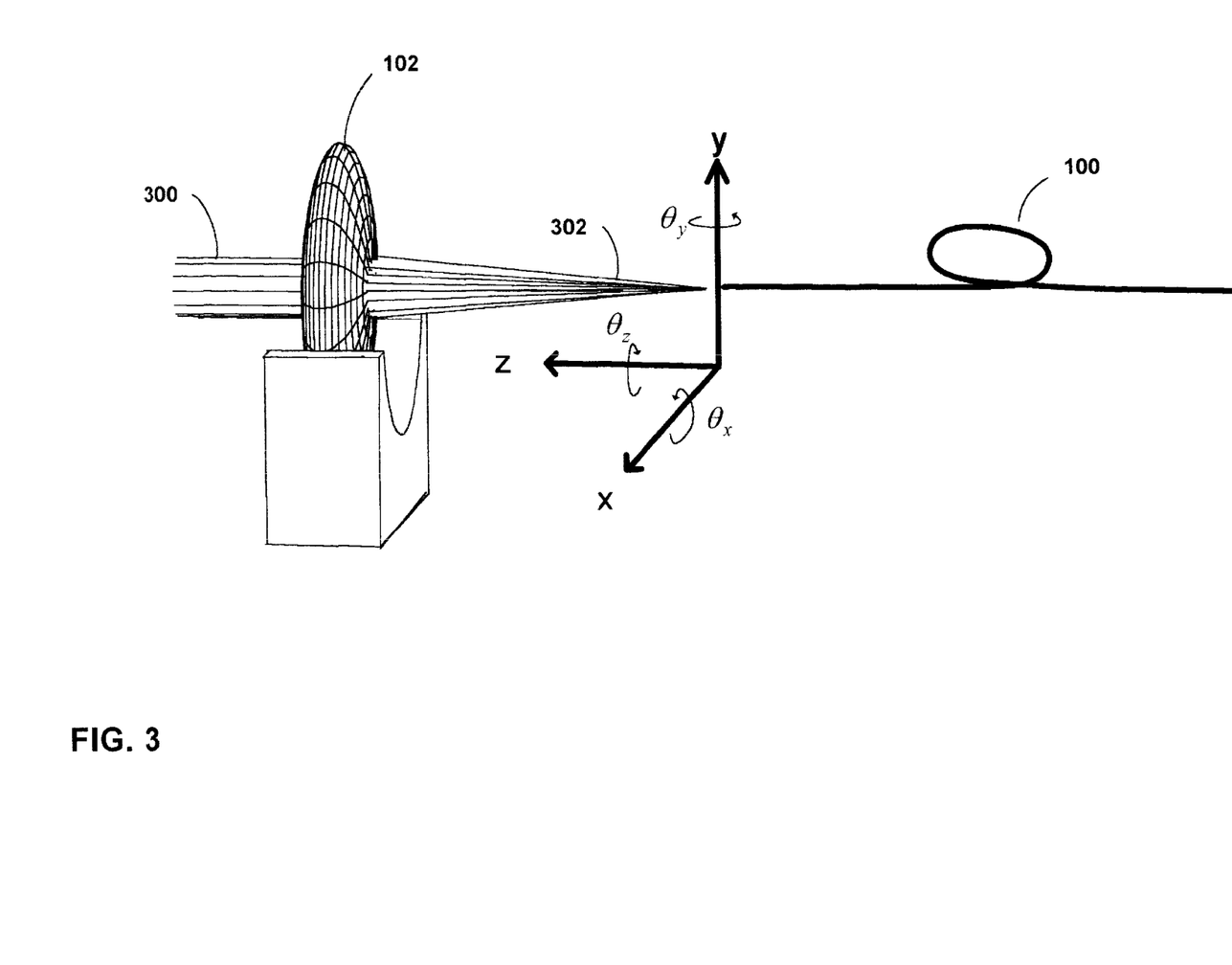
FIG. 3 is a hardware block diagram showing various degrees of freedom required to align an optical beam with a fiber optic in accordance with an embodiment of the invention.

FIG. 3 is a hardware block diagram showing various degrees of freedom required to align an optical beam with a fiber optic in accordance with an embodiment of the invention. The lens 102 and fiber 100 are shown. An optical beam 300 is shown passing through the lens where it is focused 302 on the tip of the fiber optic 100. Absent precise alignment a considerable portion of the beams energy will not couple with the fiber. The current invention provides means for positioning the beam with up to 6 degrees of freedom to allow optimal coupling.

Launching a collimated free-space laser beam into a non-polarization maintaining fiber requires alignment capability with up to five degrees of freedom For a lens placed in the center of the beam, the fiber must be manipulated in x, y, z, $\theta_x$, $\theta_y$. The effect of a lens is to bend the optical rays of the beam through an angle defined by the displacement of the beam from the lens center and the lens focal length. Therefore, x or y motion of the lens and fiber is equivalent to $\theta_x$ or $\theta_y$ motion of the fiber. After positioning and alignment of the optical components with the eccentric sleeves the close fitting sleeves and frame are bonded to one another using epoxy or other bonding techniques. Epoxy bonds of the closely fit sleeves and frame exhibit negligible displacement on curing due to well-balanced forces. Such bonds are also stable over wide environmental conditions.

Polarization Maintaining Fiber

Fiber launch into a polarization maintaining fiber contains a sixth degree of freedom. In this case, a stress axis in the fiber must be aligned to the polarization state of the optical beam. Because of the fiber's angled facet (typically used to avoid back-reflection at the fiber-air interface), this degree of freedom causes effective beam location change on the lens, which corresponds to a combination of $\theta_x$ and $\theta_y$ changes. The most complete option is to use nested eccentric cylinders to hold the fiber plus lens assembly, reserving fiber rotation for adjustment of polarization. The loose tolerances on placement of the fiber plus lens assembly raise the possibility that the rotation of the fiber can be optimized for polarization, and the rotation of the whole assembly can adequately place the assembly within the desired tolerance of the optimum location.

In an embodiment of the invention alignment may be computer controlled through rotary drivers coupled independently to each of the eccentric sleeves and with logic to monitor intensity of light passed through the assembly to determine the optimal coupling configuration.

The tolerances provided by the eccentric sleeves of the current invention are within 0.1 micron for x,y translations and the corresponding angular rotations $\theta_x$ or $\theta_y$. For the z axis tolerances of 2 micron appear acceptable. For $\theta_z$, an approximate minimum incremental angular rotation of 0.2 degrees may easily be achieved. Sliding the two cylinders closer or farther apart within the sleeve accounts for the required z degree of freedom Rotating the source/sink or the fiber in combination with the fiber-lens assembly may provide the necessary rotation about the z axis.

Figure 4:
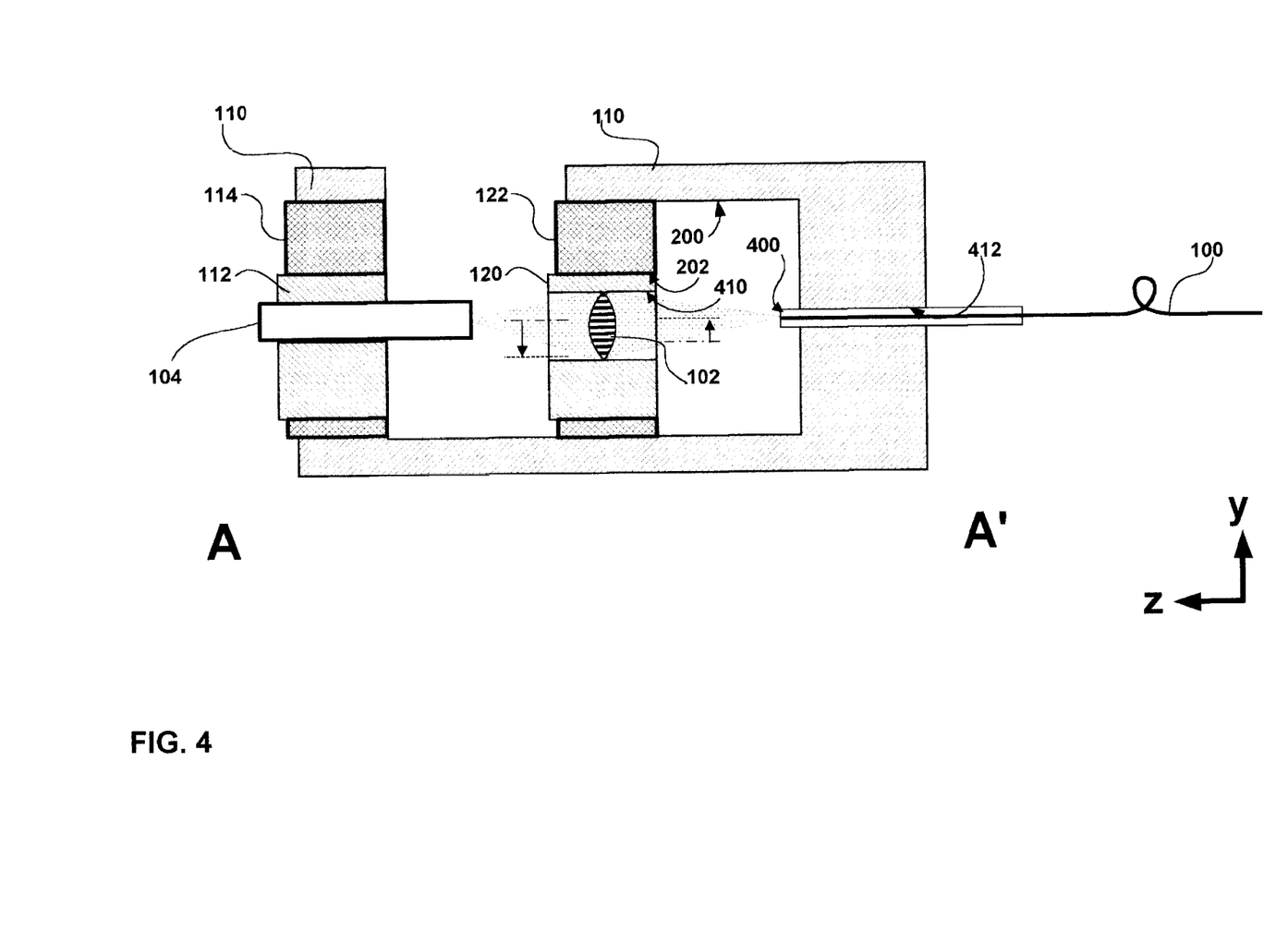
FIG. 4 is a cross-sectional elevation of the fiber optic aligner shown in FIG. I at cross-section A–A'.

FIG. 4 is a cross-sectional elevation of the fiber optic aligner shown in FIG. 1 at cross-section A–A'. The optical source/sink 104 is shown positioned within the inner sleeve 112 of the dual eccentric sleeves 112–114. The lens 102 is shown positioned within the bore 410 of the inner bore of inner sleeve 120. The outer surface of that sleeve is slidably positioned within the bore 202 of the outer eccentric sleeve 122. The outer eccentric sleeve is in turn rotatably positioned within the bore 200 of the frame 110. The optical fiber 100 and specifically the capillary end thereof is rotatably positioned within the bore 412 on the distal end of the frame 110. An optical beam is shown coupling the tip 400 of the fiber optic with the source/sink 104 via the lens 102.

Translation of the lens in the x-y plane is brought about via eccentric rotations effected by the dual sleeves 120–122. Translation of the source/sink 120 in the x-y plane is brought about via eccentric rotations effected by the dual sleeves 112–114. A translation of source/sink 104 in the x-y plane is optically equivalent to and a substitute for angular rotations $\theta_x$ and/or $\theta_y$ of fiber 100. A translation of the lens in the x-y plane is optically equivalent to and a substitute for translations x and/or y of fiber 100. Of the final degrees of freedom $\theta_z$ can be achieved by rotating the fiber 100 or source 104 within the corresponding bore. Positioning along the z axis can be achieved by movement along that axis of either the source or fiber within their corresponding bores.

Figure 5:
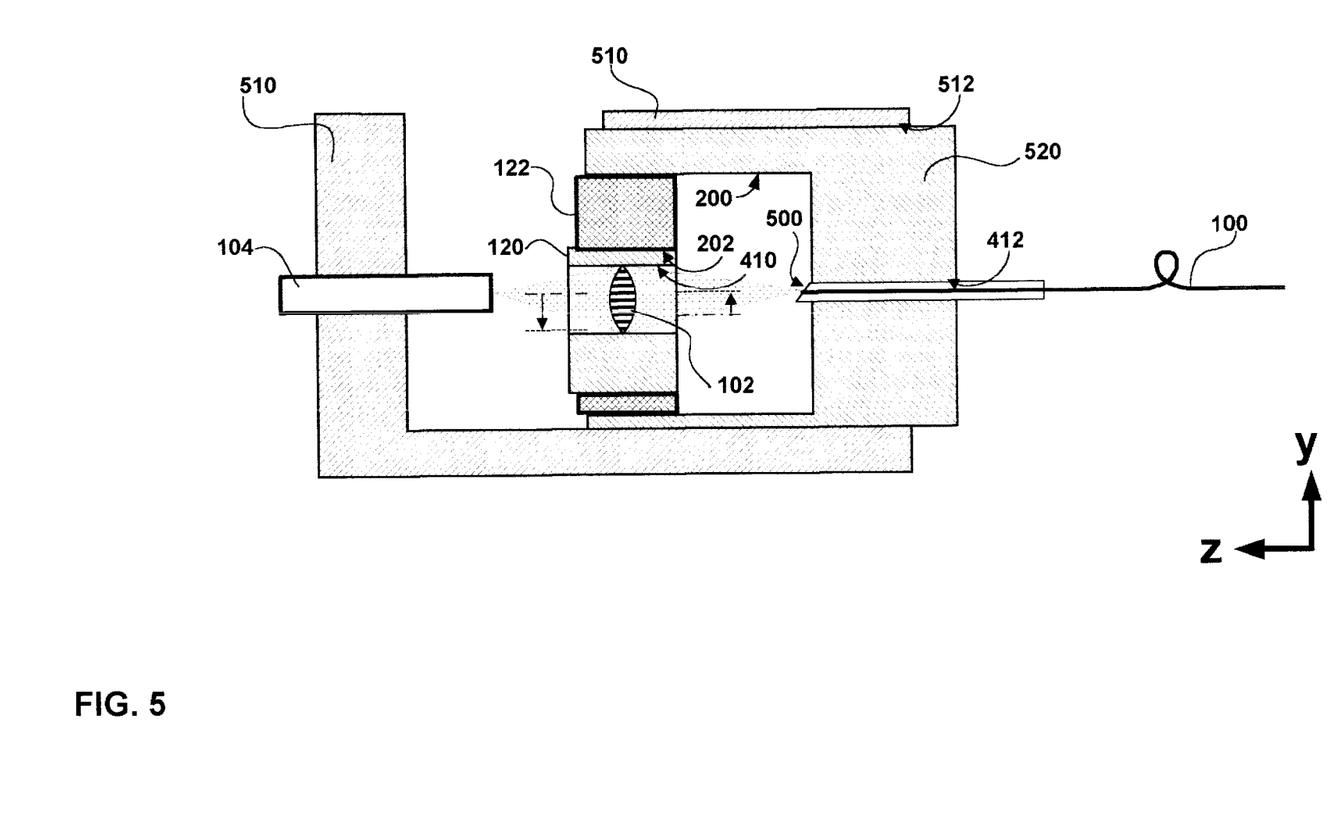
FIGS. 5–7 are/cross-sectional elevations of alternate embodiments for the fiber optic aligner shown in FIG. 4.
Figure 6:
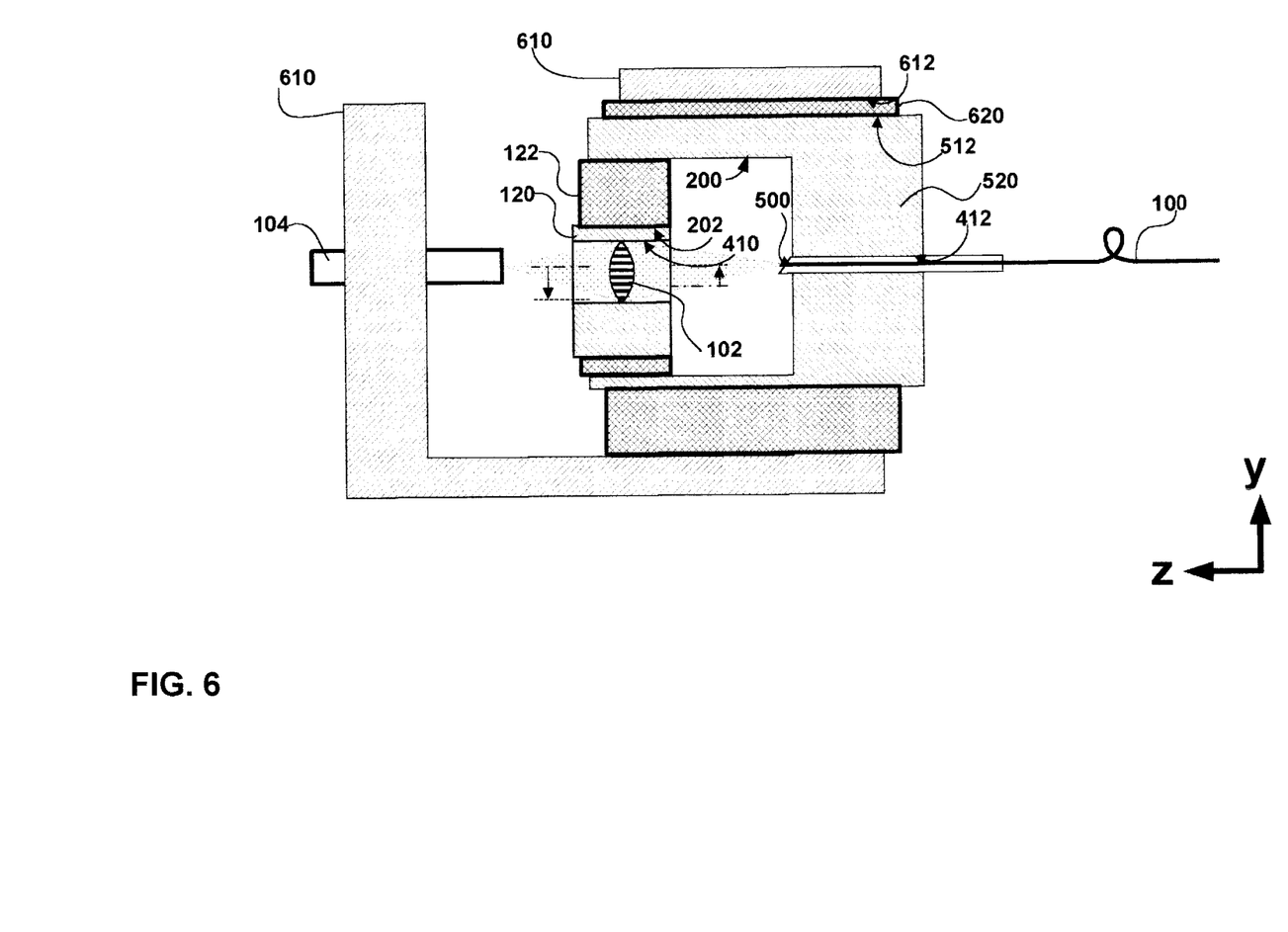
Figure 7:
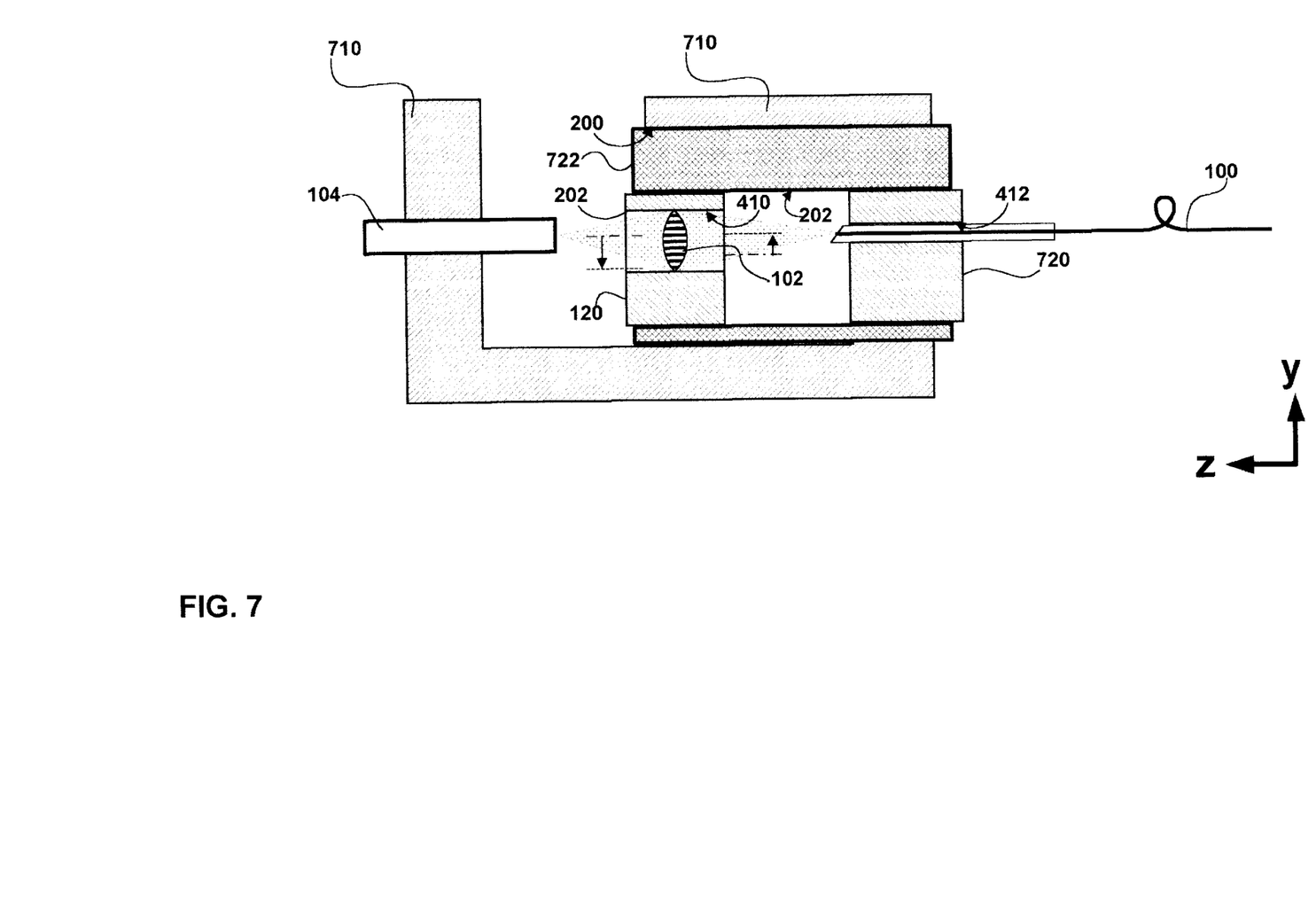

FIGS. 5–7 are cross-sectional elevations of alternate embodiments for the fiber optic aligner shown in FIG. 4.

In FIG. 5 the source/sink 104 is rotatably seated within a bore of the frame 510. No eccentrics surround it. Three eccentric sleeves, the above discussed inner sleeve 120, the outer (now intermediate sleeve 122) and an additional outermost sleeve 520 are positioned within a bore 512 of the frame 510. The outermost sleeve 520 has an inner bore 200 within which the outermost eccentric 122 of the dual eccentrics 120–122 is positioned. The optical fiber 100 has a beveled tip 500 to reduce back reflection.

Translations of the lens in the x-y plane is brought about via eccentric rotations effected by the dual sleeves 120–122. A rotation of the fiber 100 and outermost of the sleeves 520 generates x-y translation equivalent optically to and a substitute for angular rotations $\theta_x$ and/or $\theta_y$ of the fiber 100. Of the final degrees of freedom $\theta_z$ can be achieved by rotating the source 104.

In FIG. 6 frame 610 defines a bore 612 within which a fourth eccentric sleeve 620 with a bore 512 is positioned. Within the bore of the fourth eccentric sleeve is positioned eccentric sleeve 520 with a bore 200. Within bore 200 the dual eccentrics 120–122 are positioned. The source/sink 104 is rotatably seated in frame 610. No eccentrics surround it.

Translations of the lens in the x-y plane is brought about via eccentric rotations effected by the dual sleeves 120–122. Translations of sleeves 620 and 520 generate x-y translations equivalent optically to and a substitute for angular rotations $\theta_x$ or $\theta_y$ of fiber 100. Of the final degrees of freedom $\theta_z$ can be achieved by rotating the source 104 or by rotations of the fiber 100. Movement on the z axis may result from either the fiber or source/sink.

In FIG. 7 the lens 102 is positioned within eccentric sleeve 120. The optical fiber 100 is positioned within an eccentric bore 412 of an eccentric sleeve 720. Both eccentric sleeves 120 and 720 are positioned within bore 202 of a common outer eccentric sleeve 722. This sleeve 722 is positioned within a bore 200 of frame 710. The source/sink 104 is rotatably seated in frame 610. No eccentrics surround it. This arrangement effects similar degrees of freedom to those discussed above in FIG. 5 with the possible exception of gaps in coverage shown in the following FIG. 8. The x-y translations result in toroidal coverage of the x-y plane.

Translations of the lens in the x-y plane is brought about via eccentric rotations effected by the dual sleeves 120–720. Rotations of sleeve 722 and rotations of fiber 100 generate x-y translations equivalent optically to and a substitute for angular rotations $\theta_x$ and/or $\theta_y$ of fiber 100. Of the final degrees of freedom $\theta_z$ can be achieved by rotating the source 104. Movement on the z axis may result from either the fiber or source/sink.

Figure 8:
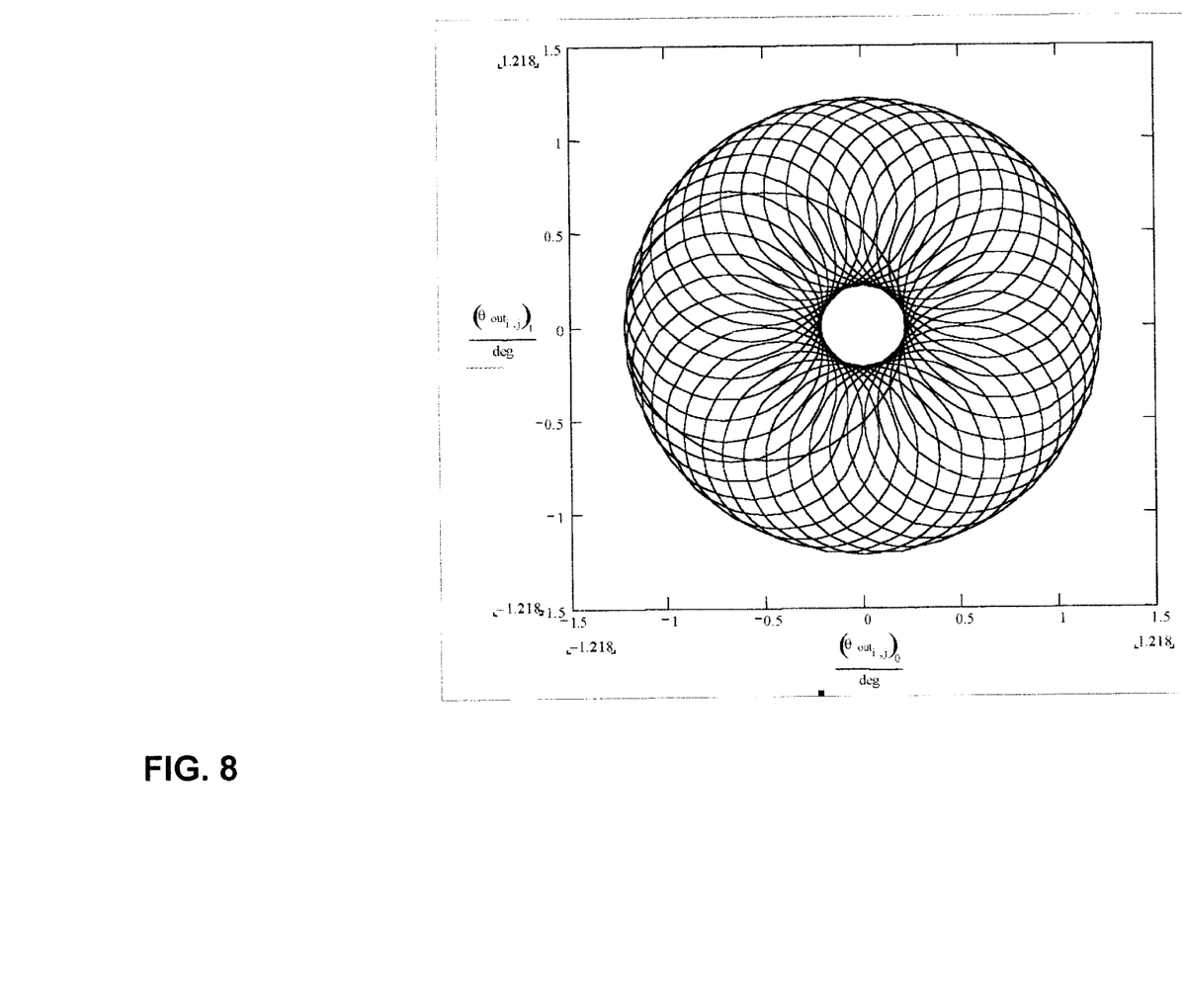
FIG. 8 is a graphs showing the planar translation effected by the dual eccentric alignment mechanism shown in FIG. 7.

FIG. 8 is a graphs showing the planar translation effected by the dual eccentric alignment mechanism shown in FIG. 7.

Figure 9:
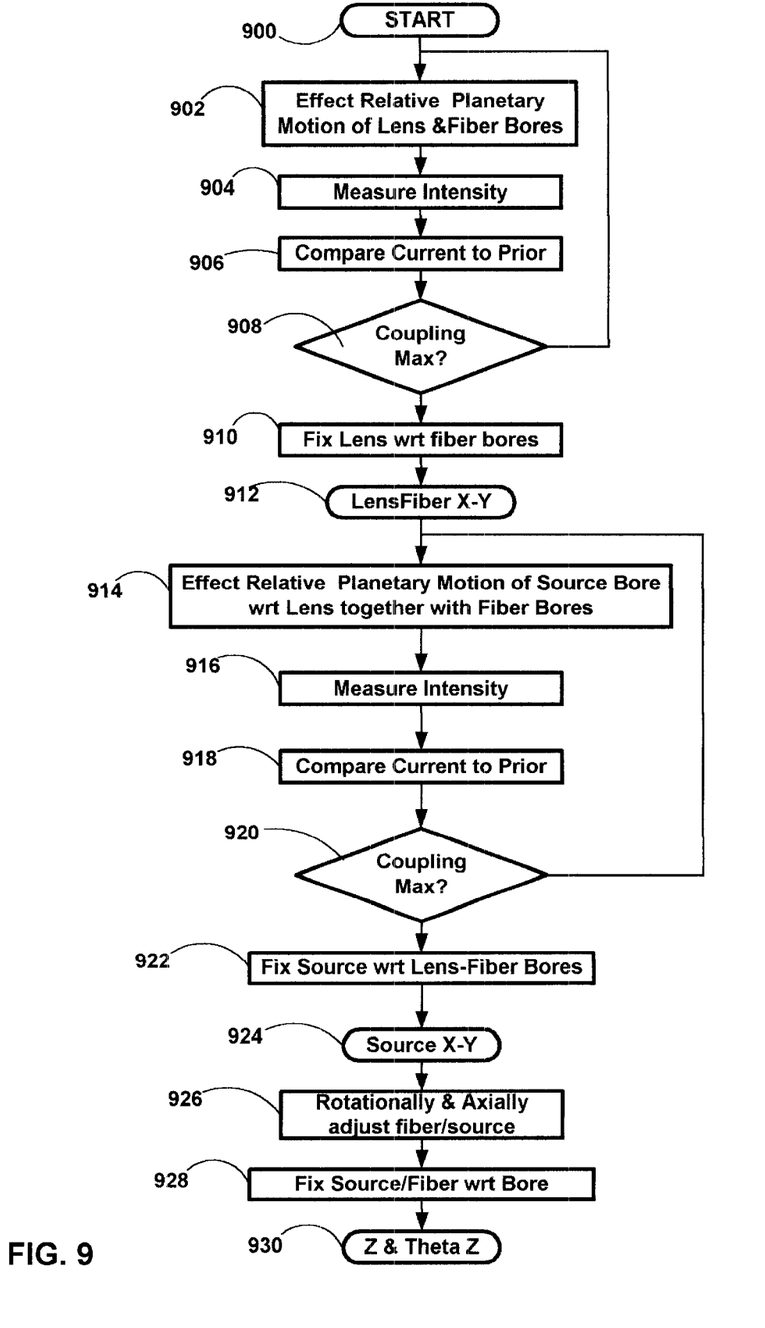
FIG. 9 is a process flow diagram of an embodiment of the processes associated with alignment of a fiber optic, a lens, and an optical source.

FIG. 9 is a process flow diagram of an embodiment of the processes associated with alignment of a fiber optic, a lens, and an optical source. The processes may be implemented automatically or manually and result in the alignment across six degrees of freedom for optical components such as the embodiments discussed above. The processes are set forth in blocks with a first x-y translation accomplished on the fiber lens pair with respect to one another in processes 902–912, the next x-y translation optically equivalent to and a substitute for angular rotations $\theta_x$ or $\theta_y$ in processes 914–922. The final block of processes 926–930 accounts for alignment with respect to the z axis and $\theta_z$. The processes may in alternate embodiments of the invention be carried out with alternate ordering of the process blocks without departing from the scope of the invention.

Processing begins at start block 900 after which control passes to process 902. In process 902 relative motion of the lens and fiber with respect to one another is brought about by rotation of the eccentric sleeve(s) which encompass one or both of these components. As translation to each new relative location is effected, the intensity of a test beam passing through the source/sink, lens and fiber is measured using external instrumentation (not shown) in process 904. For automated embodiments of the invention logic compares in process 906 current and prior intensity measurements to control relative movement of the eccentric sleeve(s) toward an optimal x-y alignment. When this point is located as determined in decision process 908 control is passed to process 910. In process 910 the lens bore and fiber optic bores are fixed relative to one another in process 912 using epoxy, welding or other fixation technique. In the case of the embodiment shown in FIG. 4 dual eccentric sleeves 120–122 are fastened to one another and to the frame 110. At transition block 912 the first of the x-y translation process blocks is complete. Control then passes to process 914.

In process 914 relative motion of the source/sink bore relative to the combined lens together with fiber bores is brought about by rotation of the eccentric sleeve(s) which encompass one or both of these component/component-assemblies. As translation to each new relative location is effected, the intensity of a test beam passing through the source/sink, lens and fiber is measured using external instrumentation (not shown) in process 916. For automated embodiments of the invention logic compares in process 918 current and prior intensity measurements to control relative movement of the eccentric sleeve(s) toward an optimal x-y alignment. When this point is located as determined in decision process 920 control is passed to process 922. In process 922 the source/sink bore is fixed relative to the combined lens together with fiber bores. In the case of the embodiment shown in FIG. 4 dual eccentric sleeves 112–114 are fastened to one another and to the frame 110. At transition block 924 the second of the x-y translation process blocks is complete. This x-y translation accomplished in this block of processes is optically equivalent to and a substitute for angular rotations $\theta_x$ or $\theta_y$. Control then passes to process 926.

The final block of processes 926–930 accounts for alignment with respect to the z axis and $\theta_z$. In alternate embodiment of the invention an iterative approach to the above mentioned processes may be utilized to accomplish the alignment of the optical components. In this alternate embodiment more than one pass through the above mentioned processes may be required to effect the optimal alignment of the optical components.

In alternate embodiments of the invention where fewer degrees of freedom are required for the positioning of optical components a single x-y translation alone may be sufficient to align optical components.

In an alternate embodiment of the invention the nested eccentric sleeves may be utilized to align optical components such as an optical source together with a detector, one corner prism with another corner prism etc.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. An apparatus for aligning a first optic element and a second optic element, and the apparatus comprising:
    a frame defined along a longitudinal axis and a selected one of the first and second optic elements coupled to the frame along the longitudinal axis;
    a first translation member coupled with a remaining one of the first and second optic elements, and the first translation member coupled with the frame to translate a remaining one of the first and second optic elements in a first plane intersected by the longitudinal axis;
    a lens for bending an optical beam between the first and second optic elements; and
    a second translation member coupled to the lens, and the second translation member coupled to the frame to translate the lens in a second plane which intersects the longitudinal axis between the first and second optic elements thereby bending the optical beam between the first and second optic elements.

2. The apparatus of claim 1, wherein at least one of the first and second translation members further comprises:
    a pair of eccentric sleeves rotationally coupled with the frame to effect an epicyclic translation of an associated one of the first optic element, the second optic element and the lens.

3. The apparatus of claim 1, wherein the first and second translation members each further comprises:
    a pair of eccentric sleeves rotationally coupled with the frame to effect an epicyclic translation of an associated one of the first optic element, the second optic element and the lens.

4. The apparatus of claim 1 with the longitudinal axis corresponding with the "z" axis in an "xyz" Cartesian coordinate system and with the translations of the first and second translation members effecting four degrees of freedom including: x, y,$\theta_x$,$\theta_y$ in an alignment of the first and second optic elements.

5. The apparatus of claim 4, with the selected one of the first and second optic elements slidably coupled within the frame for axial adjustment along the longitudinal axis to effect a fifth degree of freedom Z in the alignment of the first and second optic elements.

6. The apparatus of claim 4, with the selected one of the first and second optic elements including an optical fiber with a beveled tip portion, and the optical fiber rotatably coupled to the frame to effect by rotation of the beveled tip portion a fifth degree of freedom $\theta_z$ in the alignment of the first and second optic elements optical elements.

7. The apparatus of claim 1, with the first and second translation members effecting both angular and linear alignment of the first and second optic elements with respect to one another.

8. The apparatus of claim 1, wherein the lens focuses and collimates the optical beam between the first and second optical elements depending on a propagation direction.

9. The optical apparatus of claim 1 wherein the first and second optic element include at least one of: an optical fiber and a laser.

10. A method for aligning an optical sink with an optical source emitting an optical beam, and the method comprising:
    positioning a lens along a longitudinal axis between the optical source and sink for focusing and collimating the optical beam depending on a propagation direction; and epicyclically translating the lens and at least a selected one of the optical source and sink in corresponding planes each intersected by the longitudinal axis to align both a position and an angle of the optical beam with respect to the optical source.

11. The method for aligning of claim 10, wherein the epicyclically translating act further comprises:

first epicyclically translating the lens in the corresponding plane to effect the position alignment of the optical beam with respect to the optical source; and second epicyclically translating the selected one of the optical source and sink in the corresponding plane to effect the angular adjustment of the optical beam with respect to the optical source.

12. The method for aligning of claim 10, with the longitudinal axis corresponding with the "z" axis in a Cartesian coordinate system and with the epicyclic translations in the act of epicyclically translating effecting four degrees of freedom including: $x, y, \theta_x, \theta_y$ in an alignment of the optical source and the optical sink with respect to one another.

13. The method for aligning of claim 12, further comprising the act of:

axially adjusting along the longitudinal axis the selected one of the optical source and the optical sink to effect a fifth degree of freedom, Z in the alignment of the optical source and the optical sink with respect to one another.

14. The method for aligning of claim 12, wherein the selected one of the optical source and the optical sink includes an optical fiber with a beveled tip portion, and further comprising the act of:

rotating the optical fiber tip to effect a fifth degree of freedom $\theta_z$ in the alignment of the optical source and the optical sink with respect to one another.

15. A means for aligning an optical sink with an optical source emitting an optical beam, and the means comprising:

means for positioning a lens along a longitudinal axis between the optical source and sink for focusing and collimating the optical beam depending on a propagation direction; and means for epicyclically translating the lens and a selected one of the optical source and sink in corresponding planes each intersected by the longitudinal axis to align both a position and an angle of the optical beam with respect to the optical source.

16. The means for aligning of claim 15, wherein the means for epicyclically translating further comprises:

a first means for epicyclically translating the lens in the corresponding plane to effect the position alignment of the optical beam with respect to the optical source; and a second means for epicyclically translating the selected one of the optical source and sink in the corresponding plane to effect the angular adjustment of the optical beam with respect to the optical source.

17. The means for aligning of claim 15, with the longitudinal axis corresponding with the "z" axis in a Cartesian coordinate system and with the means for epicyclically translating effecting four degrees of freedom including: $x, y, \theta_x, \theta_y$ in an alignment of the optical source and the optical sink with respect to one another.

18. The means for aligning of claim 17, further comprising:

means for axially adjusting along the longitudinal axis the selected one of the optical source and the optical sink to effect a fifth degree of freedom, Z in the alignment of the optical source and the optical sink with respect to one another.

19. The means for aligning of claim 17, wherein the selected one of the optical source and the optical sink includes an optical fiber with a beveled tip portion, and further comprising:

means for rotating the optical fiber tip to effect a fifth degree of freedom $\theta_z$ in the alignment of the optical source and the optical sink with respect to one another.

* * * * *